UNITED STATES PATENT OFFICE.

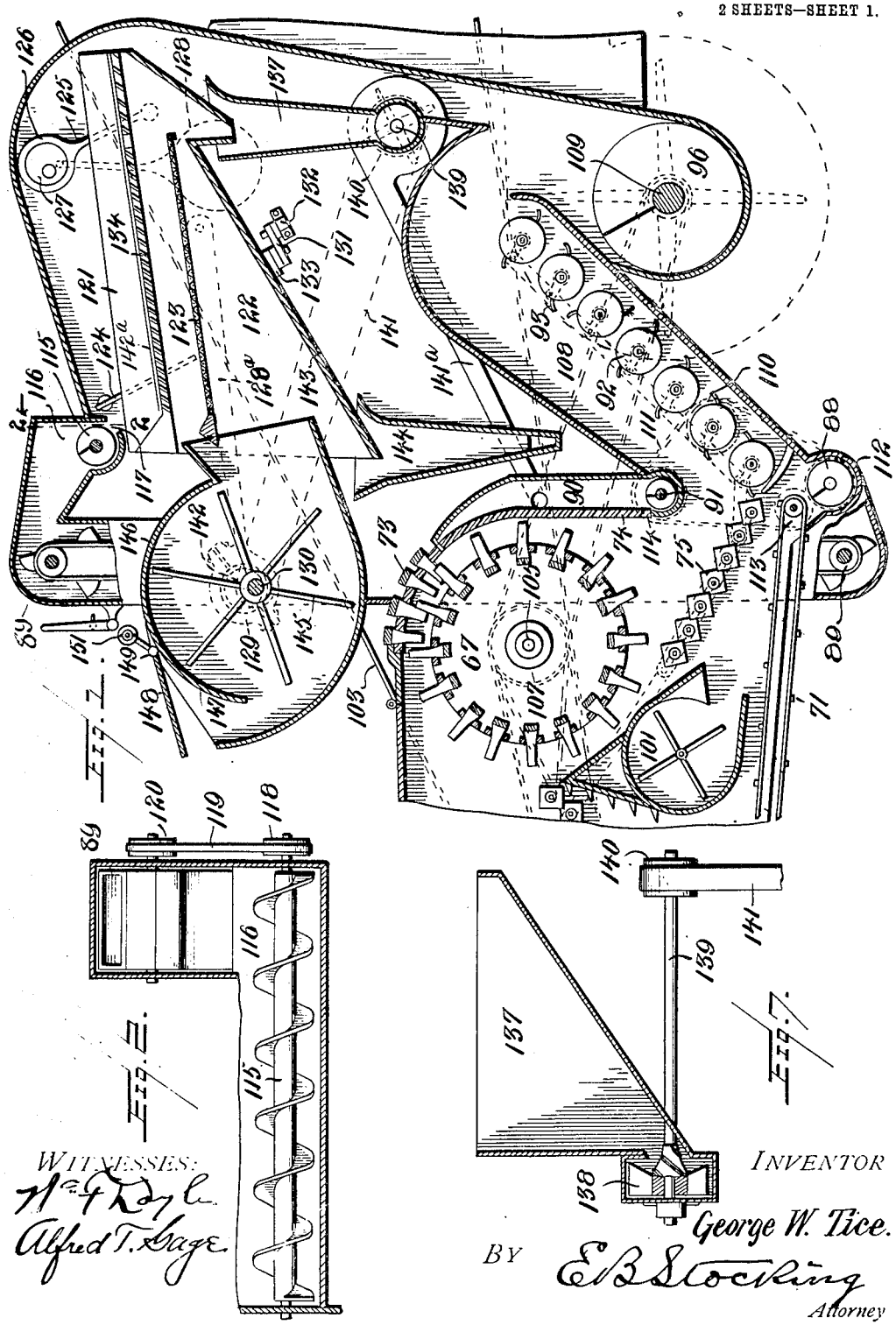

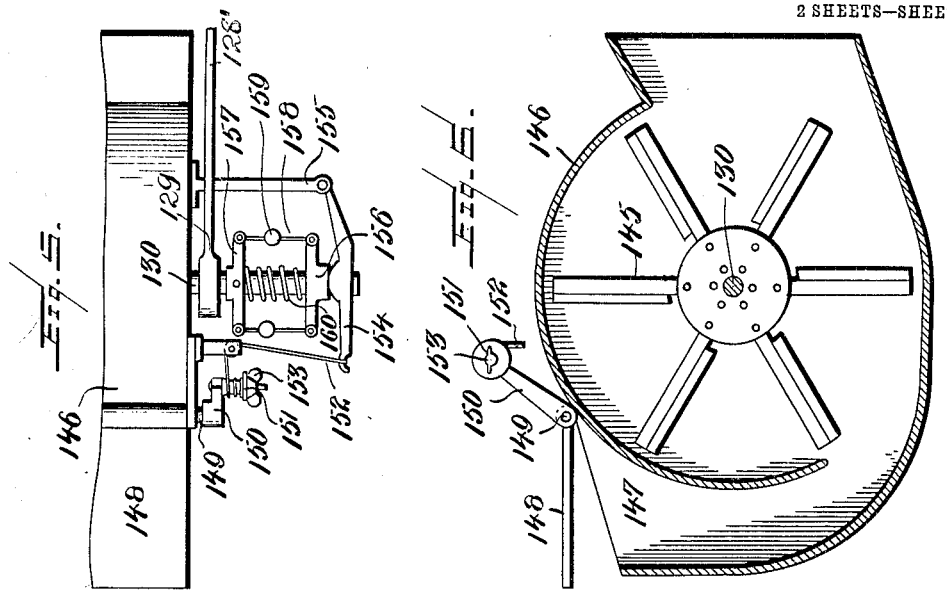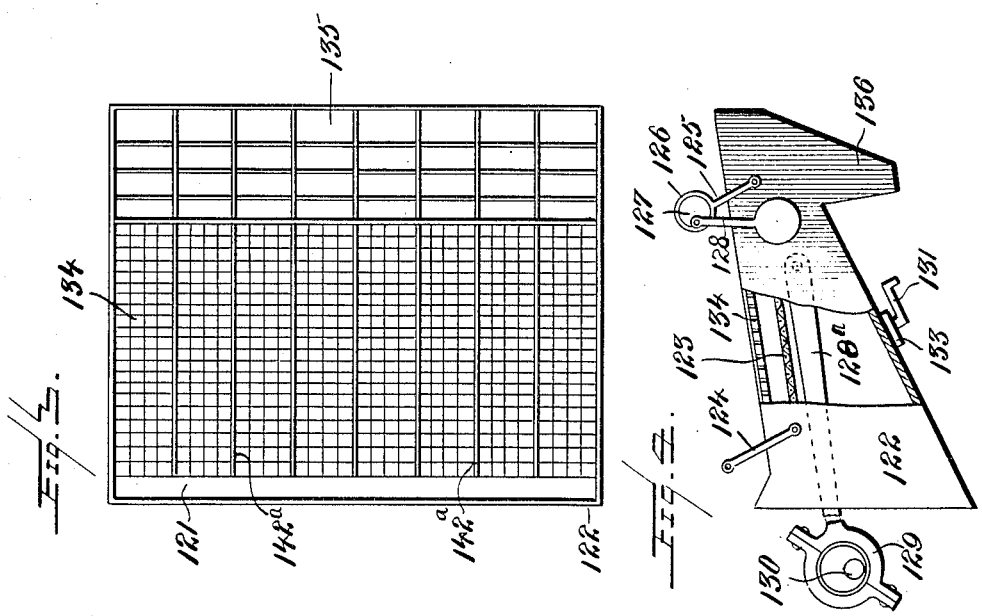

GEORGE W. TICE, OF RILEY CENTER, MICHIGAN, ASSIGNOR OF ONE-HALF TO ALLEN K. TICE, OF LARIMORE, NORTH DAKOTA.

GRAIN-SEPARATOR.

No. 871,743.  Specification of Letters Patent.  Patented Nov. 19, 1907.

Original application filed November 23, 1905, Serial No. 288,763. Divided and this application filed September 20, 1906. Serial No. 335,392.

*To all whom it may concern:*

Be it known that I, GEORGE W. TICE, a citizen of the United States, residing at Riley Center, in the county of St. Clair, State of Michigan, have invented certain new and useful Improvements in Grain-Separators, comprising a division of my original application filed November 23, 1905, Serial No. 288,763, of which the following is a specification, reference being had therein to the accompanying drawing.

This invention relates to a grain separator, and particularly to a shoe adapted for operation in connection with a threshing machine to perform a cleaning of the threshed grain.

The invention has for an object to provide an improved construction and arrangement of the cleaning or separating mechanism coöperating with an automatically controlled air blast extending upward through the separating screen said screen being so disposed that the delivery from the chaffer screen at one end is directly into the huller mechanism.

A further object of the invention is to provide a cleaning shoe adapted to coöperate with the straw conveying fan of the threshing mechanism whereby the suction from said fan coöperates with the blast fan acting upon the screens so as to create a positive current or draft of air through the separator casing which will carry all refuse material from the screens downward into the fan of the straw conveyer to be discharged thereby.

Other and further objects and advantages of the invention will be hereinafter set forth and the novel features thereof defined by the appended claims.

In the drawings:—Figure 1 is a vertical section through a threshing and cleaning machine showing the invention applied thereto; Fig. 2 is a detail cross section of the conveyer from the elevator to the chaffing screen on line 2—2, Fig. 1; Fig. 3 is a plan of the chaffing screen; Fig. 4 is a side elevation showing the mounting thereof; Fig. 5 is a plan of the regulating mechanism for the cleaner fan; Fig. 6 is a vertical section through said fan, and Fig. 7 is an enlarged vertical section of the hulling hopper.

Like numerals of reference indicate like parts throughout the several views of the drawings.

In the form of the invention illustrated the grain to be threshed is carried over the cylinder 67 into contact with the teeth carried by the concave 73 thereof and passes downward over the screen 74 which forms one wall of the conveying chamber 90, said chamber being provided with a conveyer 91 at its base adapted to discharge into the elevator 89 by which it is conveyed to the cleaning mechanism. The straw falls upon the grates 75 and is conveyed therefrom by the straw conveying rakes 92 each of which is provided with arms 93 and rotatably mounted. Communicating with the upper end of this straw conveying chamber is the suction fan 96 by which the straw is drawn from the conveyers and discharged at any desired point. Beneath the grates 75 is a conveyer apron 71 adapted to discharge into the lower conveyer 88 which communicates with the lower portion of the elevator 89. The straw in its passage from the grate 75 is in fine particles owing to passing through the threshing operation and to prevent this material from mixing with the grain a blast fan 101 is disposed at the rear of said grate to carry this light material off the grate into the straw conveying chamber while the action of this fan is supplemented by the fan 96.

The parts hereinbefore described may be driven by any desired connection, for instance, the belt 103 extends to the shaft 105 of the threshing cylinder 67. The shaft 105 is provided with a supplemental driving pulley 107 from which power is conveyed by a belt 108 to the shaft 109 of the fan 96. The shaft of one of the straw conveyers 92 is provided with a pulley 110 from which the belt 111 extends over the driving pulley 112 for the conveyer 88 and over the pulley 113 for the apron 71, thence over the pulley 114 upon the shaft of the conveyer 91 in the chamber 90, said parts being driven by motion acquired from the straw conveying members.

The separated grain is delivered from the elevator 89 to the cleaning mechanism, as shown in Fig. 1, and distributed equally over the cleaning screens regardless of the angle or inclination of the machine. This is accomplished by means of the screw conveyer 115 mounted in a casing 116, which casing is provided with an opening 117 in its lower side portion. This conveyer 115 is driven by a pulley 118 connected by belt 119 with the driving pulley 120 at the upper end of the elevator, as shown in Fig. 2. The grain is delivered from this screw conveyer upon the chaffing screen 121, as shown in Figs. 3 and 4. This screen is mounted in a casing 122 which also contains cleaning screen 123, such casing being pivotally mounted by means of the link 124 pivoted thereto and to the frame of the machine at one end of the casing, and at the opposite end by means of the link 125 pivoted to the casing 122, and having a collar 126 surrounding the eccentric 127, which prevents a rising and falling movement of one end of the screens in their travel. The eccentric is also provided with a depending weighted arm 128 which maintains this end of the casing in normally level position.

When the machine rests in an inclined position the weighted arm or pendulum shifts the eccentric carried thereby so as to restore the level of the end of the cleaning mechanism. If the machine be standing upon uneven ground so that the feed end of the screen is higher than the delivery end it will be seen that this inclination will cause the grain to flow very rapidly and much good material lost if both hanger arms were of equal length relative to their pivot. Under this condition if the feed end of the screen be elevated above its normal position the weighted arm swings the eccentric upward and retains the delivery end of the screen at the proper level. In the event of the inclination of the machine when the delivery end of the screen is too high the reverse operation occurs. This weight retains the eccentric in a relatively fixed relation to the collar and hanger pivoted thereon so that the latter in its travel equalizes or neutralizes the rising oscillation given to the screen at the opposite end thereof and converts the movement into a substantial reciprocation at the delivery end of the screen. The screen travels longitudinally and is oscillated in a vertical plane at one end while at the opposite end this oscillation is converted into a reciprocatory travel.

The casing 122 is reciprocated longitudinally by means of a pitman 128$^a$ connected to an eccentric 129 upon the driving shaft 130 of the cleaner fan. This casing is also given a lateral or side movement during its reciprocatory travel by means of the crank arm 131 pivoted to the frame of the machine at 132 and to the screen casing at 133.

The chaffing screen 121 is provided with a surface 134 of proper mesh for the passage of the grain therefrom to the cleaning screen 123 beneath the same and at its outer end is provided with a portion 135 of wider mesh through which any unhulled grain or unthreshed heads will pass by means of the chute portion 136 into the hopper 137, as shown in detail in Fig. 7. This hopper communicates at its lower portion with the huller blades 138 driven by shaft 139 carrying driving pulley 140 which is connected by belt 141 with a similar pulley 142 upon the shaft 130 of the cleaner fan. The grain hulled by these blades passes downward through the chute 141$^a$ from whence it is discharged into the chamber 90 and then returned to the elevator 89 for the subsequent cleaning action. The chaffer screen 121 is provided with a series of parallel ribs 142$^a$ raised above the surface thereof which tend to prevent any lateral movement of the grain in the shaking of the screen and thus secure an even feed over the screen and deposit upon the cleaning screen 123. The material passing from this latter screen falls upon the board 143 from whence it is directed into the delivery chute 144.

The blower 145, shown in detail in Figs. 5 and 6, is disposed within a casing 146 which is provided with an air intake 147 at one side thereof having a valve 148 pivotally mounted at 149 and provided with an operating lever 150 carrying at its end a winding spool 151 from which the connecting cord 152 extends. This spool is adapted to be rotated for the purpose of lengthening and shortening the cord 152 and is held in its adjusted position by means of the thumb nut 153 so that it is in fixed relation to the arm 150, while the parts are in operation. This cord extends to a lever 154 which is pivotally mounted upon a bracket 155 and is adapted to engage the movable member 156 carried by a governing mechanism upon the shaft 130. This mechanism comprises a fixed member 157 having a link connection 158 with the movable member 156. These links are provided with governor weights 159 which in their outward movement retract the member 156, and place spring 160 disposed upon the shaft 130 under proper tension. When this spring is distended, as shown in Fig. 5 the valve 148 is held in open position, but as the speed of the fan increases and consequent blast of air becomes greater the retraction of the member 156 slacks the connection with the valve 148 causing the same to gradually close so as to positively deliver an even current of air for the full width of the cleaning screens. This automatic regulation of the air inlet to the fan permits the proper amount to be fed to the cleaner under the varying conditions of slow and fast threshing, as an increase in the speed of the fan reduces the air opening, while a decrease thereof increases the capacity of its opening.

A portion of the grain removed from the threshing cylinder is carried directly through the screen at the back thereof, while the straw with the remaining grain falls upon the conveyers, the former being carried by the straw conveyer and thence by the fan to the discharge, while the grain passes downward through the grates and conveyers to the elevator by which it is carried upward and deposited upon the movable cleaning and chaffing screens. These screens are under the constant action of the air blast from the fan which communicates with the interior casing thereof, and the straw, hulls or other material which is carried off of the screens is conveyed downward to the fan of the straw conveyer which assists the cleaning fan by creating a suction draft therefrom. The material passing from the chaffing screen is also received upon the cleaner screen from which it is delivered into the delivery chute while the material which passes off the cleaner screen, as well as the unhulled material from the chaffing screen is carried by gravity into the hulling blades from which it is returned to the conveyer for a repetition of the cleaning action. The screw conveyer by which the grain is fed from the elevator to the cleaning screen provides for the even feed thereon while the reciprocatory movement of this screen combined with the vertical movement at the end due to the eccentric connection and the lateral movement thereof produces the most efficient screening action as the grain is thoroughly agitated on the surface of the screen while the automatic regulation of the air blast through this screen prevents excessive blast thereon by which the grain might be carried away with the refuse and maintains a constant pressure during the separating action.

Having now described my invention and set forth its merits, what I claim and desire to secure by Letters Patent is:—

1. In a machine of the class described, a machine casing, a cleaner mechanism, a pivoted hanger at one end of said casing and connected to said mechanism, an eccentrically mounted circular bearing at the opposite end of said mechanism, a hanger pivoted at its upper end upon said bearing and at its lower end to said mechanism, and means to automatically shift said bearing upon its axis in the inclination of the casing.

2. In a machine of the class described, a machine casing, a cleaning mechanism, a pivoted hanger disposed at one end thereof, an eccentrically mounted circular bearing disposed at its opposite end, a strap pivoted on said bearing and having a hanger pivoted to said mechanism, means to automatically shift said bearing upon its axis, and means independent of the eccentric bearing for vibrating said mechanism.

3. In a machine of the class described, a cleaning mechanism, a pivotally mounted link at one end thereof, a weighted eccentric disposed at its opposite end, a strap extending from said eccentric to said cleaner, a driving shaft provided with an eccentric, and a pitman extending from said driving shaft to the cleaner.

4. In a machine of the class described, a cleaning mechanism, a pivotally mounted link at one end thereof, a weighted eccentric disposed at the opposite end, a strap extending from said eccentric to said cleaner, a driving shaft provided with an eccentric, a pitman extending from said driving shaft to the cleaner, and a crank arm pivotally mounted at one end upon the casing of the machine and at the opposite end upon the casing of the cleaner to effect a lateral movement during the longitudinal travel thereof.

5. In a machine of the class described, a machine casing, a cleaning mechanism, a pivoted hanger disposed at one end thereof, a relatively fixed eccentrically mounted circular bearing disposed at its opposite end, a strap pivoted upon said bearing and to said mechanism, means for vibrating said mechanism, and means to automatically shift said bearing upon the inclination of the casing.

6. In a machine of the class described, a machine casing, a cleaning mechanism, a pivoted hanger disposed at one end thereof, a relatively fixed eccentric disposed at its opposite end, a strap pivoted upon said eccentric and to said mechanism, means for vibrating said mechanism, and a pendulum weight suspended from said eccentric to shift the same upon the inclination of the casing.

7. In a machine of the class described, a cleaner screen, a hanger at one end adapted to effect a longitudinal oscillation thereof, a hanger at the opposite end pivotally mounted upon a relatively fixed eccentric, and a crank arm pivotally connected to said screen and to a fixed point to effect a lateral movement of the screen in its longitudinal travel.

8. In a machine of the class described, a chaffer screen having openings of different area at its opposite ends, a cleaner screen disposed beneath the smaller openings of the chaffer screen, a casing having an inclined bottom beneath the cleaner screen and a discharge spout at its end beyond the cleaner screen and in alinement with the larger openings of the chaffer screen, a huller mechanism communicating with said spout, a conveyer chamber communicating with said huller, and an elevator communicating with the discharge of said conveyer chamber and adapted to deliver material from the huller to the chaffer screen.

In testimony whereof, I affix my signature in presence of two witnesses.

GEORGE W. TICE.

Witnesses:
C. W. JOCELYN,
A. G. YOUNG.